US008381381B2

(12) United States Patent
Daniels

(10) Patent No.: US 8,381,381 B2
(45) Date of Patent: Feb. 26, 2013

(54) SYSTEM, METHOD AND APPARATUS FOR PRODUCING FIRE RATED DOORS

(75) Inventor: Evan R. Daniels, Frisco, TX (US)

(73) Assignee: Polymer-Wood Technologies, Inc., Frisco, TX (US)

(*) Notice: Subject to any disclaimer, the term of this patent is extended or adjusted under 35 U.S.C. 154(b) by 324 days.

(21) Appl. No.: 12/900,068

(22) Filed: Oct. 7, 2010

(65) Prior Publication Data

US 2011/0040402 A1 Feb. 17, 2011

Related U.S. Application Data

(62) Division of application No. 11/677,577, filed on Feb. 21, 2007, now Pat. No. 7,832,166.

(60) Provisional application No. 60/775,481, filed on Feb. 21, 2006.

(51) Int. Cl.
*B21D 39/03* (2006.01)
*B23P 11/00* (2006.01)

(52) U.S. Cl. .............. 29/428; 29/429; 29/430; 144/346; 144/349; 52/134.1; 52/783.14; 52/784.12

(58) Field of Classification Search ............ 29/428–430; 52/134.1, 783.14, 784.11; 144/345–347, 144/349
See application file for complete search history.

(56) References Cited

U.S. PATENT DOCUMENTS

| | | | | |
|---|---|---|---|---|
| 3,987,600 | A | 10/1976 | Baehr | |
| 4,434,899 | A | 3/1984 | Rivkin | |
| 4,716,702 | A | 1/1988 | Dickson | |
| 4,800,538 | A | 1/1989 | Passmore et al. | |
| 4,811,538 | A | 3/1989 | Lehnert et al. | |
| 4,896,471 | A | 1/1990 | Turner | |
| 5,074,087 | A * | 12/1991 | Green | 52/309.9 |
| 5,522,195 | A | 6/1996 | Bargen | |
| 5,653,075 | A | 8/1997 | Williamson | |
| 5,720,142 | A | 2/1998 | Morrison | |
| 6,067,699 | A * | 5/2000 | Jackson | 29/430 |
| 6,161,363 | A * | 12/2000 | Herbst | 52/784.15 |
| 6,268,022 | B1 | 7/2001 | Schlegel et al. | |
| 6,299,970 | B1 * | 10/2001 | Richards et al. | 428/294.7 |
| 6,311,454 | B1 * | 11/2001 | Kempel | 52/784.15 |
| 6,434,899 | B1 * | 8/2002 | Fortin et al. | 52/232 |
| 6,619,005 | B1 | 9/2003 | Chen | |
| 6,688,063 | B1 | 2/2004 | Lee et al. | |
| 6,766,621 | B2 | 7/2004 | Reppermund | |
| 6,964,722 | B2 | 11/2005 | Taylor et al. | |
| 7,185,468 | B2 | 3/2007 | Clark et al. | |
| 7,598,460 | B2 * | 10/2009 | Roberts et al. | 174/382 |
| 7,721,500 | B2 * | 5/2010 | Clark et al. | 52/455 |
| 7,832,166 | B2 * | 11/2010 | Daniels | 52/455 |

(Continued)

OTHER PUBLICATIONS

International Search Report and Written Opinion for PCT/US2007/004605 dated Oct. 4, 2007.

*Primary Examiner* — Ramesh Patel
(74) *Attorney, Agent, or Firm* — Daniel J. Chalker; Chalker Flores, LLP

(57) ABSTRACT

The present invention provides a system, method and apparatus for producing fire rated doors having added strength, better finishing and low cost manufacturing flexibility. The fire rated doors are made from two panels "sandwiched" together. An optional interior layer (e.g., fire resistant material, lead sheeting, steel or Kevlar) can be added between the door panels for various purposes. Splines, stiles or sticks are inserted in longitudinal channels in the door panels to provide assistance in aligning the door panels and greater hardware holding strength. An intumescent banding material concealed by a banding material around the perimeter of the door seals the door within its frame during a fire. The door design and the automated manufacturing process provide greater design choice, reduced cost and faster fabrication.

47 Claims, 13 Drawing Sheets

U.S. PATENT DOCUMENTS

| | | | | |
|---|---|---|---|---|
| 8,209,866 | B2 * | 7/2012 | Daniels | 29/897.32 |
| 2002/0078659 | A1 | 6/2002 | Hunt | |
| 2003/0033786 | A1 * | 2/2003 | Yulkowski | 52/784.15 |
| 2003/0115817 | A1 | 6/2003 | Blackwell et al. | |
| 2003/0205187 | A1 | 11/2003 | Carlson et al. | |
| 2003/0209403 | A1 | 11/2003 | Daniels | |
| 2003/0211251 | A1 | 11/2003 | Daniels | |
| 2003/0211252 | A1 | 11/2003 | Daniels | |
| 2007/0095570 | A1 * | 5/2007 | Roberts et al. | 174/543 |
| 2007/0125043 | A1 * | 6/2007 | Clark et al. | 52/782.1 |

* cited by examiner

SYSTEM, METHOD AND APPARATUS FOR PRODUCING FIRE RATED DOORS

PRIORITY CLAIM

This patent application is a Divisional Application of U.S. patent application Ser. No. 11/677,577 filed Feb. 21, 2007, which claims priority to U.S. Provisional Application Ser. No. 60/775,481 filed on Feb. 21, 2006, the contents of each of which are all incorporated by reference herein in their entirety.

FIELD OF THE INVENTION

The present invention relates generally to the field of door manufacturing and, more particularly, to a system, method and apparatus for producing fire rated doors.

BACKGROUND OF THE INVENTION

Many methods and techniques for manufacturing doors have been developed over time. For example, FIG. 1 shows a typical residential door 100 that is constructed from a set of interlocking perimeter boards 102, 104 and 106, internal boards 108, and panels 110 and 112. In another example, FIG. 2 shows a fire rated door 200 that is constructed from a mineral core 202 sandwiched between two medium density fiberboards 204 and 206. A perimeter channel 208 extends around the sides of the door assembly. An intumescent banding 210 is sandwiched between a first hardwood insert 212 and a second hardwood insert 214, all of which are disposed in the perimeter channel 208. Many other designs exist.

These prior art designs do not lend themselves well to fully automated manufacturing processes. Moreover, the prior art fire rated doors are expensive and require the internal mineral core. The internal core can be exposed in routed details and may reduce the strength of the door as a result of the reduced thickness of the door panels. In addition, alignment of the panels during assembly can be troublesome and require additional finishing to square the door after assembly. As a result, there is a need for a fire rated door that does not suffer from these deficiencies.

SUMMARY OF THE INVENTION

The present invention provides a system, method and apparatus for producing fire rated doors having added strength, better finishing and low cost manufacturing flexibility. The fire rated doors are made from two panels "sandwiched" together, which minimizes low density core exposure in routed details, improves routing detail appearance, provides a smoother appearance when painted, and increases the overall strength of the door assembly, through improved modulus of elasticity and modulus of rupture. An optional interior layer (e.g., fire resistant material, lead sheeting, steel or Kevlar) can be added between the door panels for various purposes. Splines, stiles or sticks are inserted in longitudinal channels in the door panels to provide assistance in aligning the door panels and greater hardware holding strength. An intumescent banding material concealed by a banding material around the perimeter of the door seals the door within its frame during a fire. The door design and the automated manufacturing process provide greater design choice, reduced cost and faster fabrication.

The present invention provides a fire rated door that includes a first routable door panel attached to a second routable door panel. Each door panel has two opposing longitudinal interior channels with each interior channel containing a spline. The attached door panels have a perimeter channel containing an intumescent banding material and an exterior banding to conceal the intumescent banding material.

The present invention also provides a fire rated door having one or more protective layers disposed between a first routable door panel and a second routable door panel. Each door panel has two opposing longitudinal interior channels. The attached door panels have a perimeter channel. A spline is disposed within each interior channel. An intumescent banding material and an exterior banding to conceal the intumescent banding material are disposed within the perimeter channel. A data device containing production data is embedded within the door.

In addition, the present invention provides a fire rated door that includes a first routable door panel attached to a second routable door panel using a fire resistant adhesive and wherein each door panel has two opposing longitudinal interior channels with each interior channel containing a spline. Alternatively, the each door panel may also have a fire resistant coating.

Moreover, the present invention provides a method for manufacturing a fire rated door by cutting two longitudinal interior channels into a back side of a door panel, assembling a door slab by inserting a spline in each longitudinal interior channel of a first door panel, attaching a second door panel to the splines and first door panel using an adhesive and applying pressure to door slab to bond the splines and door panels together, cutting a perimeter channel in the sides of the door slab, inserting an intumescent banding material and an exterior banding to conceal the intumescent banding material within the perimeter channel, routing a specified design into each panel of the door slab, applying one or more primer coats to the door slab, and machining the door slab to receive a set of hinges and lockset hardware. Note that this method can be implemented using a computer program embodied on a computer readable medium having one or more code segments to instruct a set of machines to perform the steps.

Furthermore, the present invention provides a manufacturing line to produce fire rated doors having a first set of machines to cut two longitudinal interior channels into a back side of a door panel, a second set of machines to assemble a door slab by inserting a spline in each longitudinal interior channel of a first door panel, attaching a second door panel to the splines and first door panel using an adhesive and applying pressure to door slab to bond the splines and door panels together, a third set of machines to cut a perimeter channel in the sides of the door slab, and insert an intumescent banding material and an exterior banding to conceal the intumescent banding material within the perimeter channel, a fourth set of machines to route a specified design into each panel of the door slab, a fifth set of machines to apply one or more primer coats to the door slab, a sixth set of machines to machine the door slab to receive a set of hinges and lockset hardware, and one or more conveyors interconnecting the machines to move the door slabs.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to fire rated doors, but it will be understood that the concepts of the present invention are applicable to any type of door.

The present invention provides a system, method and apparatus for producing fire rated doors having added strength, better finishing and low cost manufacturing flexibility. The fire rated doors are made from two panels "sandwiched" together, which minimizes low density core exposure in routed details, improves routing detail appearance, provides a smoother appearance when painted, and increases the overall strength of the door assembly, through improved modulus of elasticity and modulus of rupture. An optional interior layer (e.g., fire resistant material, lead sheeting, steel or Kevlar) can be added between the door panels for various purposes. Splines, stiles or sticks are inserted in longitudinal channels in the door panels to provide assistance in aligning the door panels and greater hardware holding strength. An intumescent banding material concealed by a banding material around the perimeter of the door seals the door within its frame during a fire. The door design and the automated manufacturing process provide greater design choice, reduced cost and faster fabrication.

Figure 1:
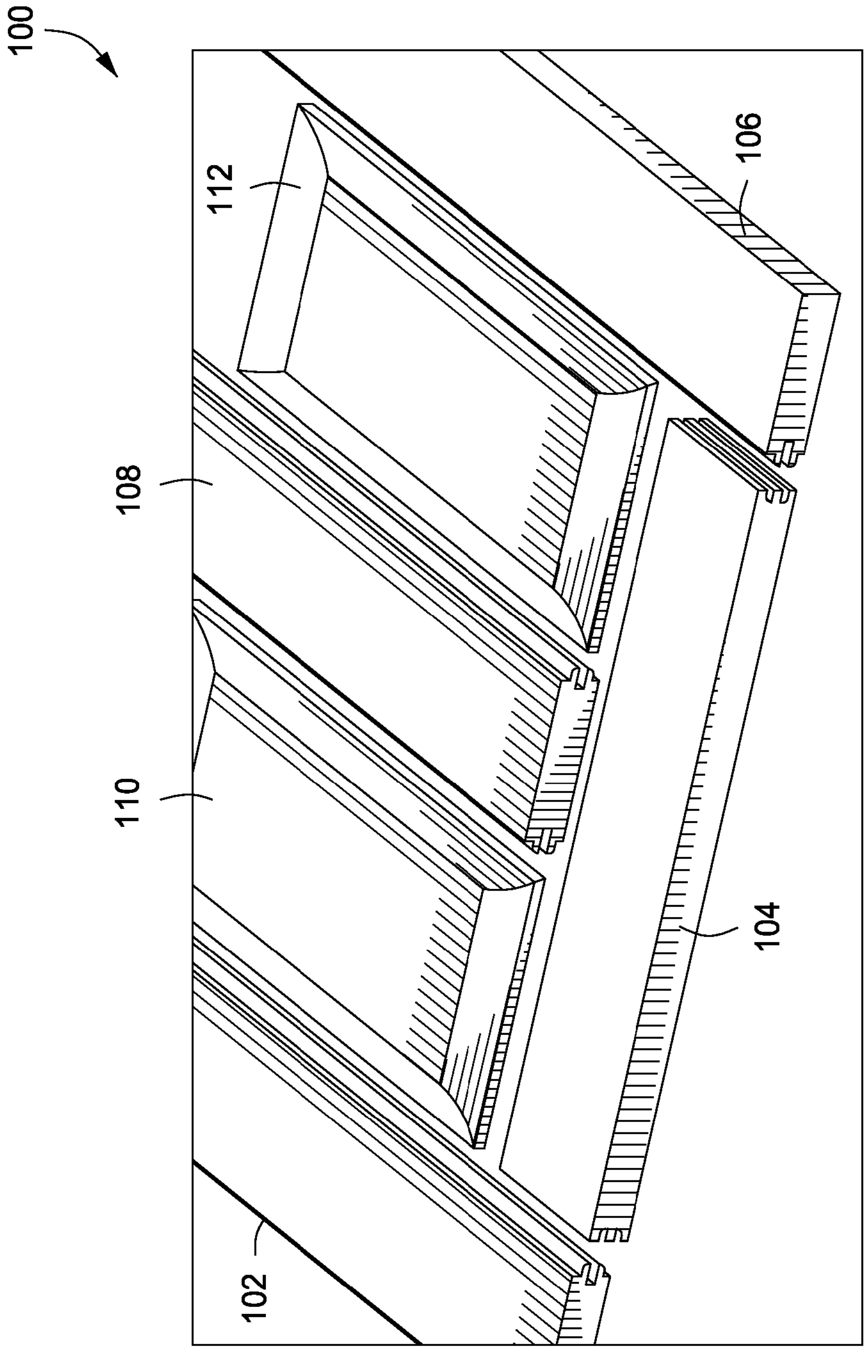
FIG. 1 (PRIOR ART)
FIG. 1 is a partial perspective exploded view of a door in accordance with the prior art.
Figure 2:
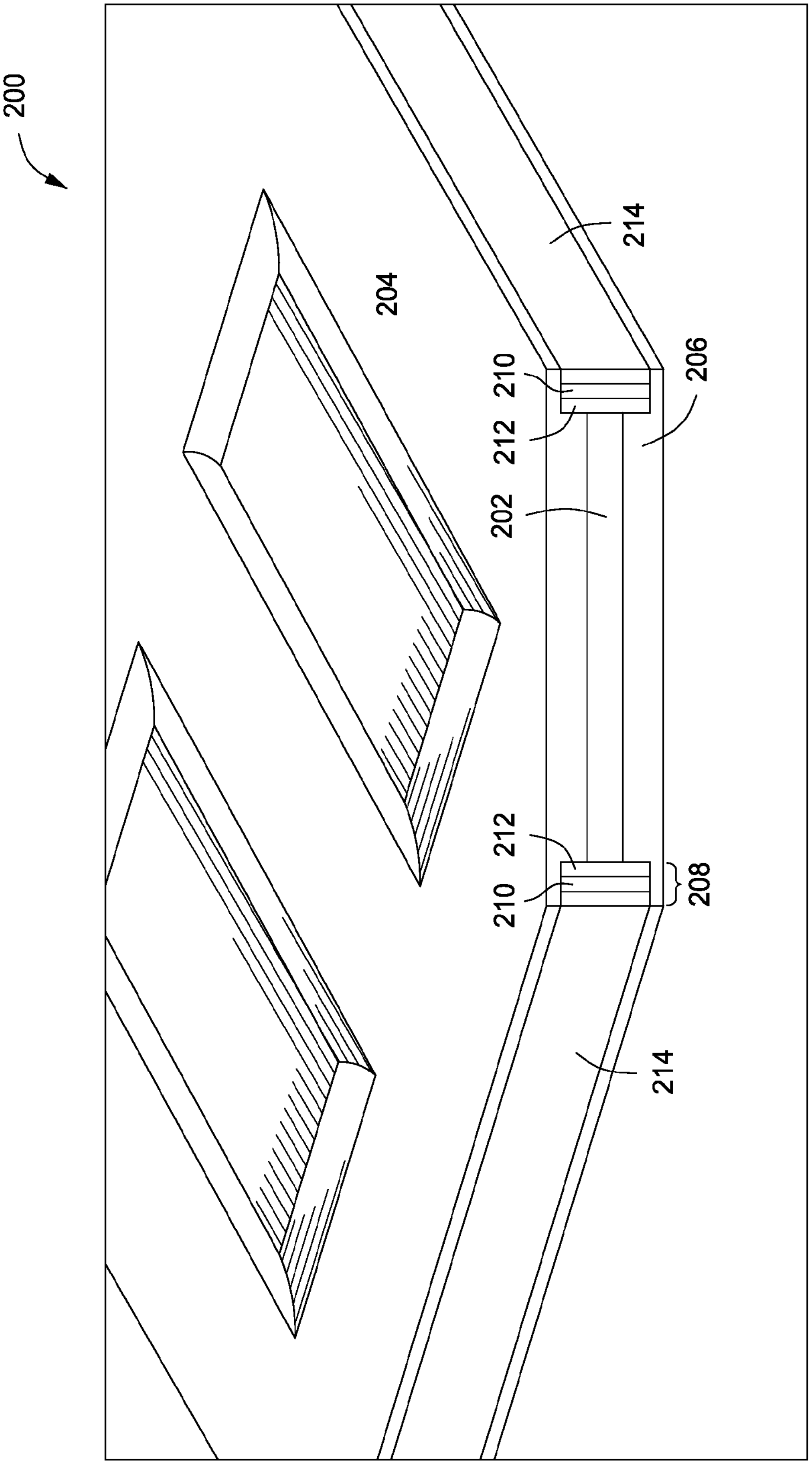
FIG. 2 (Prior Art)
FIG. 2 is a partial perspective view with a cut away of a fire rated door in accordance with the prior art.
Figure 3:
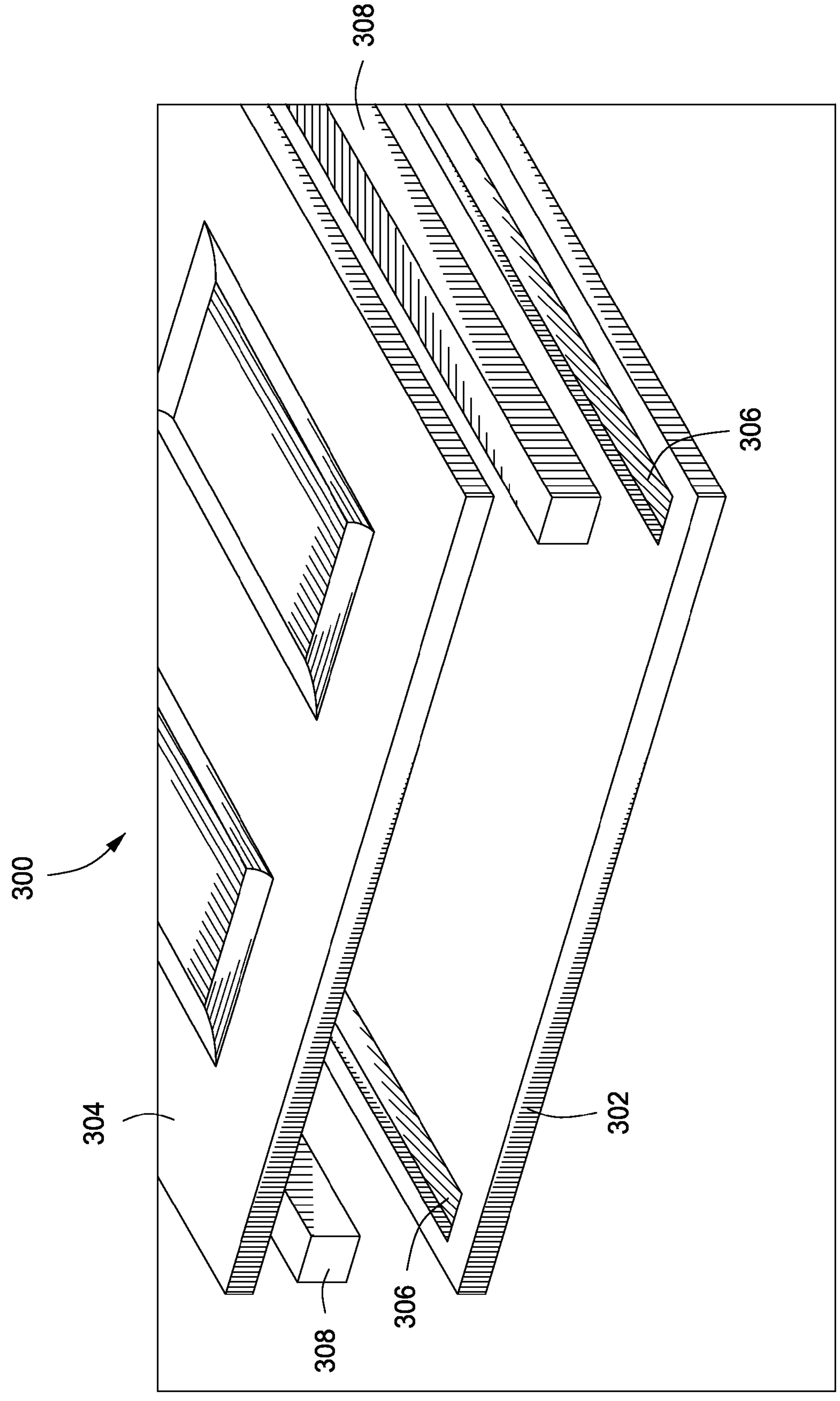
FIG. 3 is a partial perspective exploded view of a door in accordance with one embodiment of the present invention.

Now referring to FIG. 3, a partial perspective exploded view of a door 300 in accordance with one embodiment of the present invention is shown. The door 300 includes a first routable door panel 302 attached to a second routable door panel 304. The door panels 302 and 304 can be made of a lignocellulosic substrate, a wood, a wood composite, a medium density fiberboard or a combination thereof. Each door panel 302 and 304 has two opposing longitudinal interior channels, slots, grooves or recesses 306. Each interior channel, slot or groove 306 contains a spline, stick or rail 308. The spline, stick or rail 308 can be made of a hardwood or other hard composite material. The splines 308 are used to locate and align the door panels so that the door can be assembled using automated machines. As a result, the use of the splines 308 reduces errors and waste, improves the quality of the door and speeds up the production process. Alternatively, the splines can be inserted and glued on edge of the door panels in stick or tape format into a machined recess. The door panels 302 and 304 and splines 308 are attached together using an adhesive. The type of adhesive used will depend on the material properties of the door panel 102 and where the door 300 is to be installed. The adhesive may be an epoxy or glue, and may be applied by various means such as brushing or spraying, for example. A double sided tape may also be employed for some applications. The adhesive 106 may be applied to a portion or portions of one or both of the door panels 302 and 304. The adhesive is, however, preferably spread over the extent of one of the door panels 302 or 304 and is a water soluble latex based glue, isocyanate resin/glue, catalyzed glue (e.g., epoxies and contact cements) or urethane-based resin. The amount of adhesive applied to adhere the door panels 302 and 304 together is an amount at least sufficient to hold these two members together such that the door 300 can be handled and installed into its final application. The use of two panels "sandwiched" together minimizes low density core exposure in routed details, improves routing detail appearance, provides a smoother appearance when painted, and increases the overall strength of the door assembly, through improved modulus of elasticity and modulus of rupture. The outward facing portions of the door panels 302 and 304 can be finished to suit the environment in which the door 300 is being installed. Note that the previously described door can be a fire rated door by using an adhesive having fire retardant properties. Likewise, the door panels can be coated with a fire resistant or retardant material.

Figure 4:
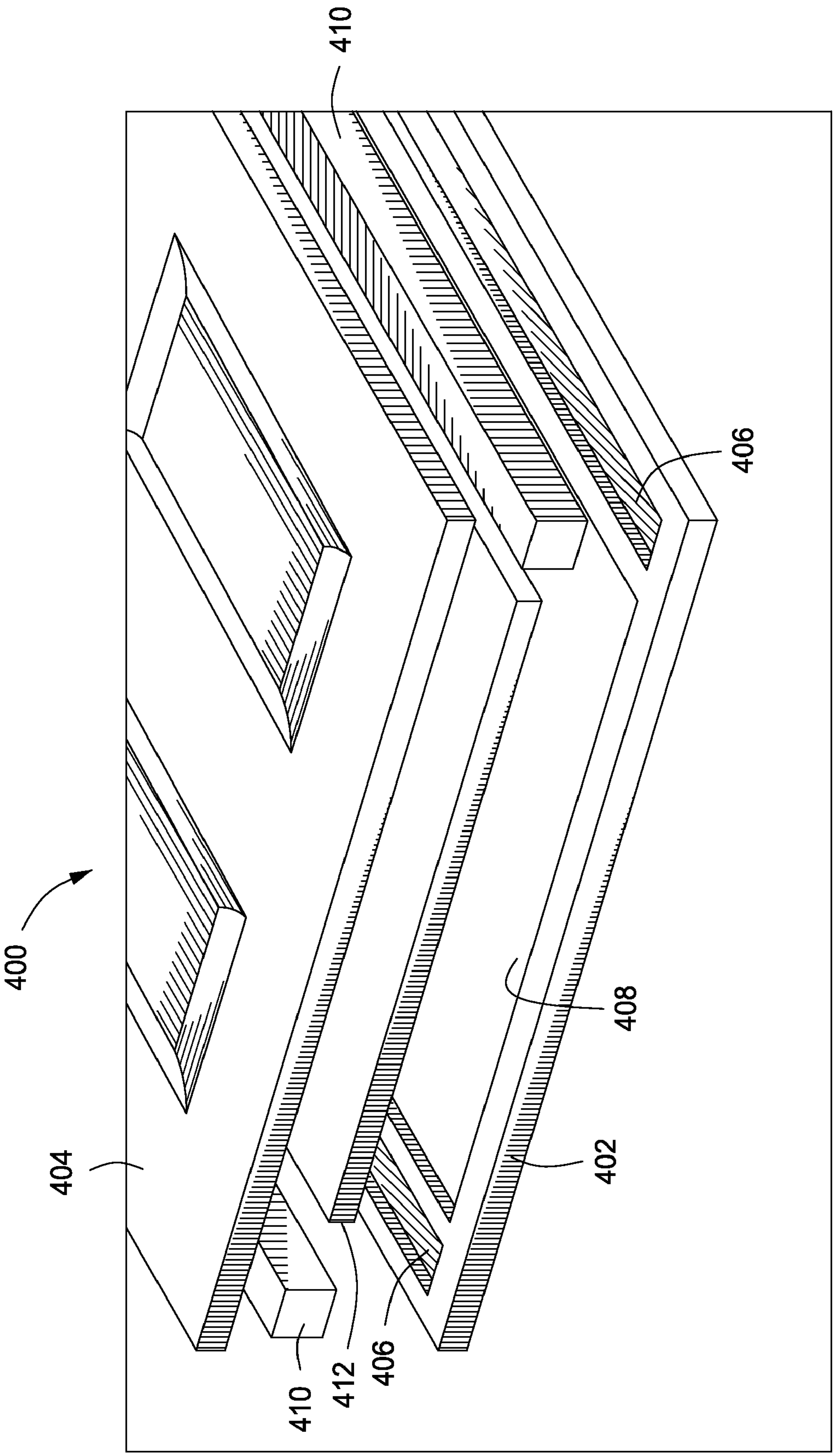
FIG. 4 is a partial perspective exploded view of a door in accordance with another embodiment of the present invention.

Referring now to FIG. 4, a partial perspective exploded view of a door in accordance with another embodiment of the present invention is shown. The door 400 includes a first routable door panel 402 attached to a second routable door panel 404. The door panels 402 and 404 can be made of a lignocellulosic substrate, a wood, a wood composite, a medium density fiberboard or a combination thereof. Each door panel 402 and 404 has two opposing longitudinal interior channels, slots, grooves or recesses 406 and a large interior channel, slot or recess 408 between the two opposing longitudinal interior channels 406. Each interior channel 306 contains a spline, stick or rail 410. The spline, stick or rail 410 can be made of a hardwood or other hard composite material, and provides the benefits previously described. The large interior channel contains one or more protective layers 412. The protective layers 412 can be a fire resistant material, a blast resistant material, a ballistic resistant material, a shielding material, a chemical resistant material, a biohazard resistant material, a radiation resistant material, a dampening material, a grounding material or a combination thereof. For example, the protective layers can be one or more gypsum boards, one or more metallic sheets, one or more lead sheets, one or more Kevlar sheets, one or more ceramic sheets, a layer of urethane foam, a layer of graphite, a wire mesh or a combination thereof. The door panels 402 and 404, splines 410 and protective layers 412 are attached together using an adhesive as previously described. The outward facing portions of the door panels 402 and 404 can be finished to suit the environment in which the door 400 is being installed. Note that the previously described door can be a fire rated door by using an adhesive having fire retardant properties. Likewise, the door panels can be coated with a fire resistant or retardant material.

Figure 5:
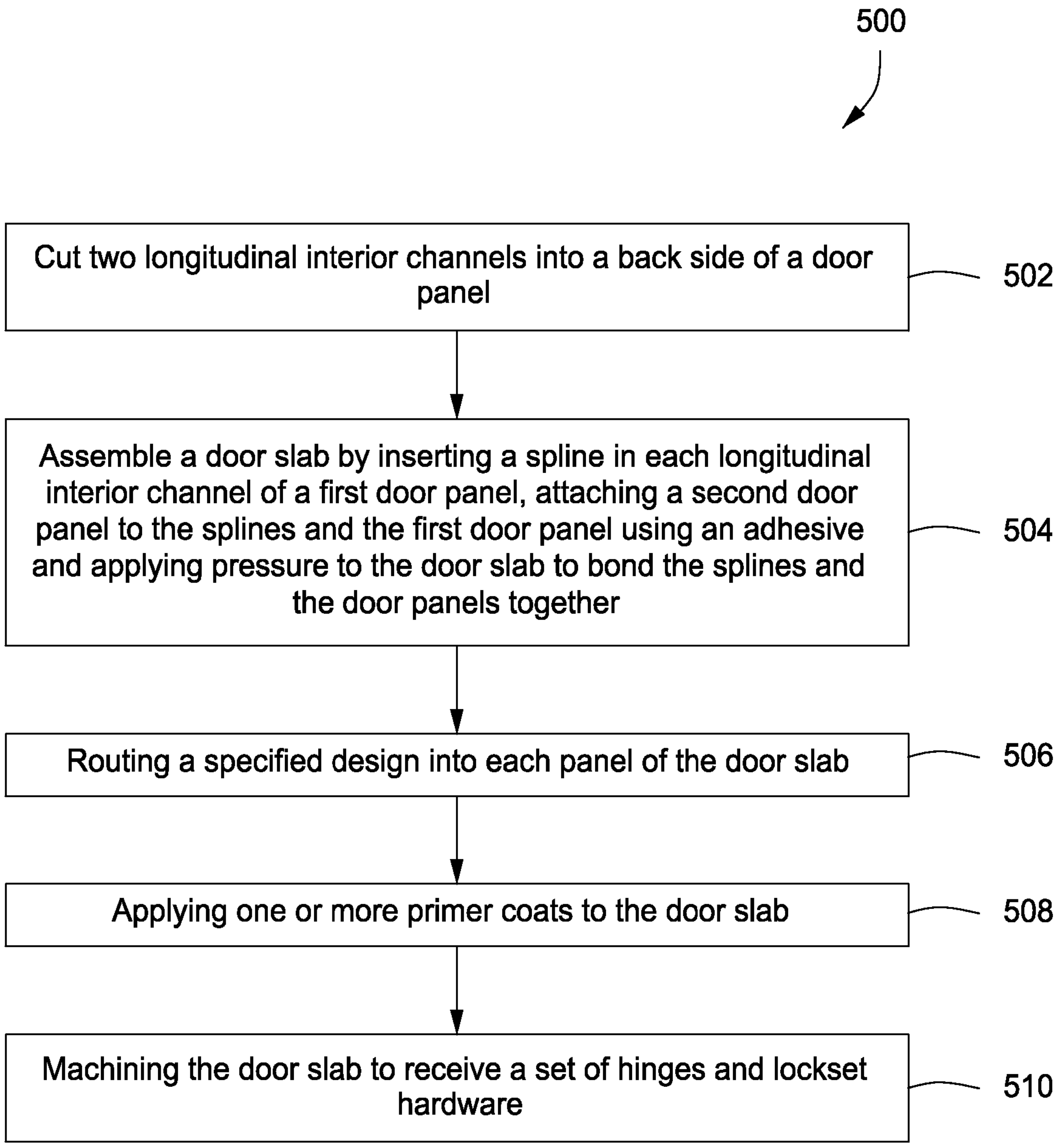
FIG. 5 is a flow chart illustrating a method to manufacture a door in accordance with one embodiment the present invention.

Now referring to FIG. 5, a flow chart illustrating a method 500 to manufacture a door in accordance with one embodiment the present invention is shown. Two longitudinal interior channels are cut into a back side of a door panel in block 502. Then in block 504, the door is assembled by (a) inserting a spline in each longitudinal interior channel of a first door panel, (b) attaching a second door panel to the splines and the first door panel using an adhesive and (c) applying pressure to the door slab to bond the splines and the door panels together. A specified design is routed into each door panel of the door slab in block 506. One or more primer coats are applied to the door slab in block 508. The primer coats can be applied using an electrostatic powder coating process. The door slab is machined to receive a set of hinges and lockset hardware in block 510. Note that the previously described door can be a fire rated door by using an adhesive having fire retardant properties. Likewise, the door panels can be coated with a fire resistant or retardant material. Note also that this method can be implemented using a computer program embodied on a computer readable medium having one or more code segments to instruct a set of machines to perform the steps.

Figure 6:
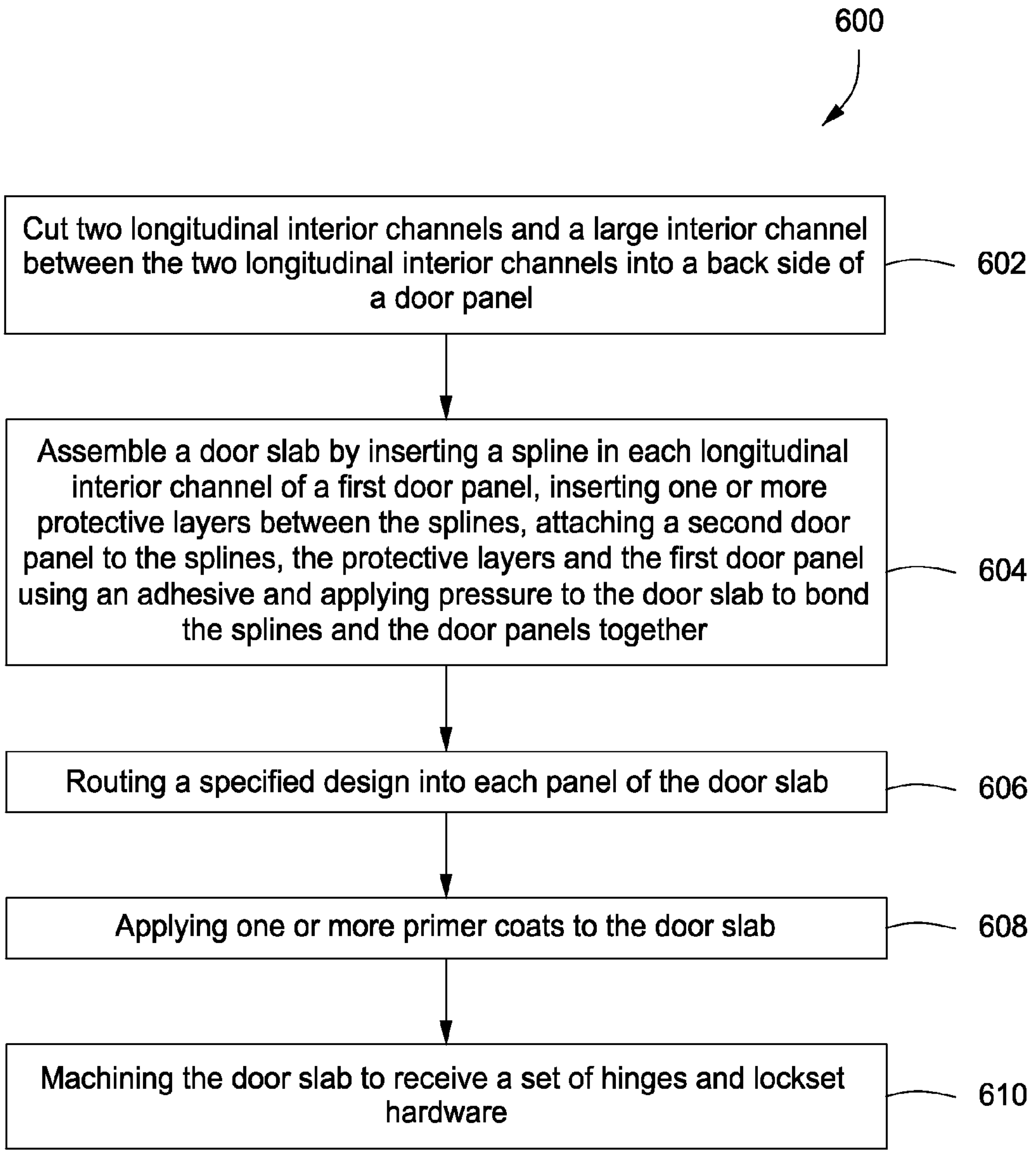
FIG. 6 is a flow chart illustrating a method to manufacture a door in accordance with another embodiment the present invention.

Referring now to FIG. 6, a flow chart illustrating a method 600 to manufacture a door in accordance with another embodiment the present invention is shown. Two longitudinal interior channels and a large interior channel between the two longitudinal interior channels are cut into a back side of a door panel in block 602. Then in block 604, the door is assembled by (a) inserting a spline in each longitudinal interior channel of a first door panel, (b) inserting one or more protective layers in the large interior channel between the splines, (c) attaching a second door panel to the splines, the protective layers and the first door panel using an adhesive, and (d) applying pressure to the door slab to bond the splines and the door panels together. The protective layers can be a fire resistant material, a blast resistant material, a ballistic resistant material, a shielding material, a chemical resistant material, a biohazard resistant material, a radiation resistant material, a dampening material, a grounding material or a combination thereof. A specified design is routed into each door panel of the door slab in block 606. One or more primer coats are applied to the door slab in block 608. The primer coats can be applied using an electrostatic powder coating process. The door slab is machined to receive a set of hinges and lockset hardware in block 610. Alternatively, the one or more protective layers are inserted between the door panels without using the large interior channel. Note that the previously described door can be a fire rated door by using an adhesive having fire retardant properties. Likewise, the door panels can be coated with a fire resistant or retardant material. Note also that this method can be implemented using a computer program embodied on a computer readable medium having one or more code segments to instruct a set of machines to perform the steps.

Figure 7:
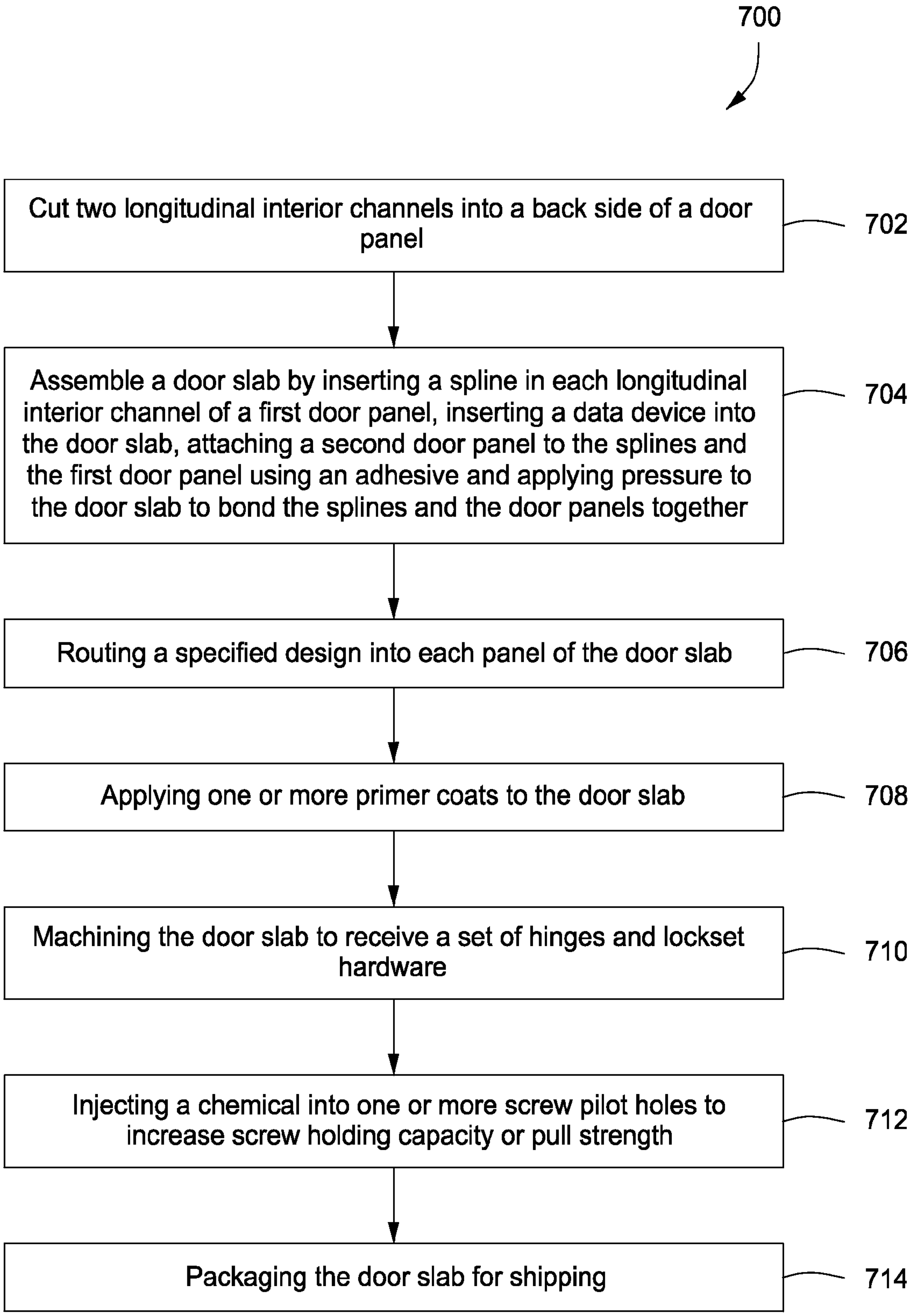
FIG. 7 is a flow chart illustrating a method to manufacture a door in accordance with yet another embodiment of the present invention.

Now referring to FIG. 7, a flow chart illustrating a method 700 to manufacture a door in accordance with yet another embodiment of the present invention is shown. Two longitudinal interior channels are cut into a back side of a door panel in block 702. Then in block 704, the door is assembled by (a) inserting a spline in each longitudinal interior channel of a first door panel, (b) inserting a data device into the door slab, (c) attaching a second door panel to the splines and the first door panel using an adhesive, and (d) applying pressure to the door slab to bond the splines and the door panels together. A specified design is routed into each door panel of the door slab in block 706. One or more primer coats are applied to the door slab in block 708. The primer coats can be applied using an electrostatic powder coating process. The door slab is machined to receive a set of hinges and lockset hardware in block 710. A chemical is injected into one or more screw pilot holes to increase the screw holding capacity or pull strength in block 712. The door slab is then packaged for shipping in block 714. Note that the previously described door can be a fire rated door by using an adhesive having fire retardant properties. Likewise, the door panels can be coated with a fire resistant or retardant material. Note also that this method can be implemented using a computer program embodied on a computer readable medium having one or more code segments to instruct a set of machines to perform the steps.

Figure 8:
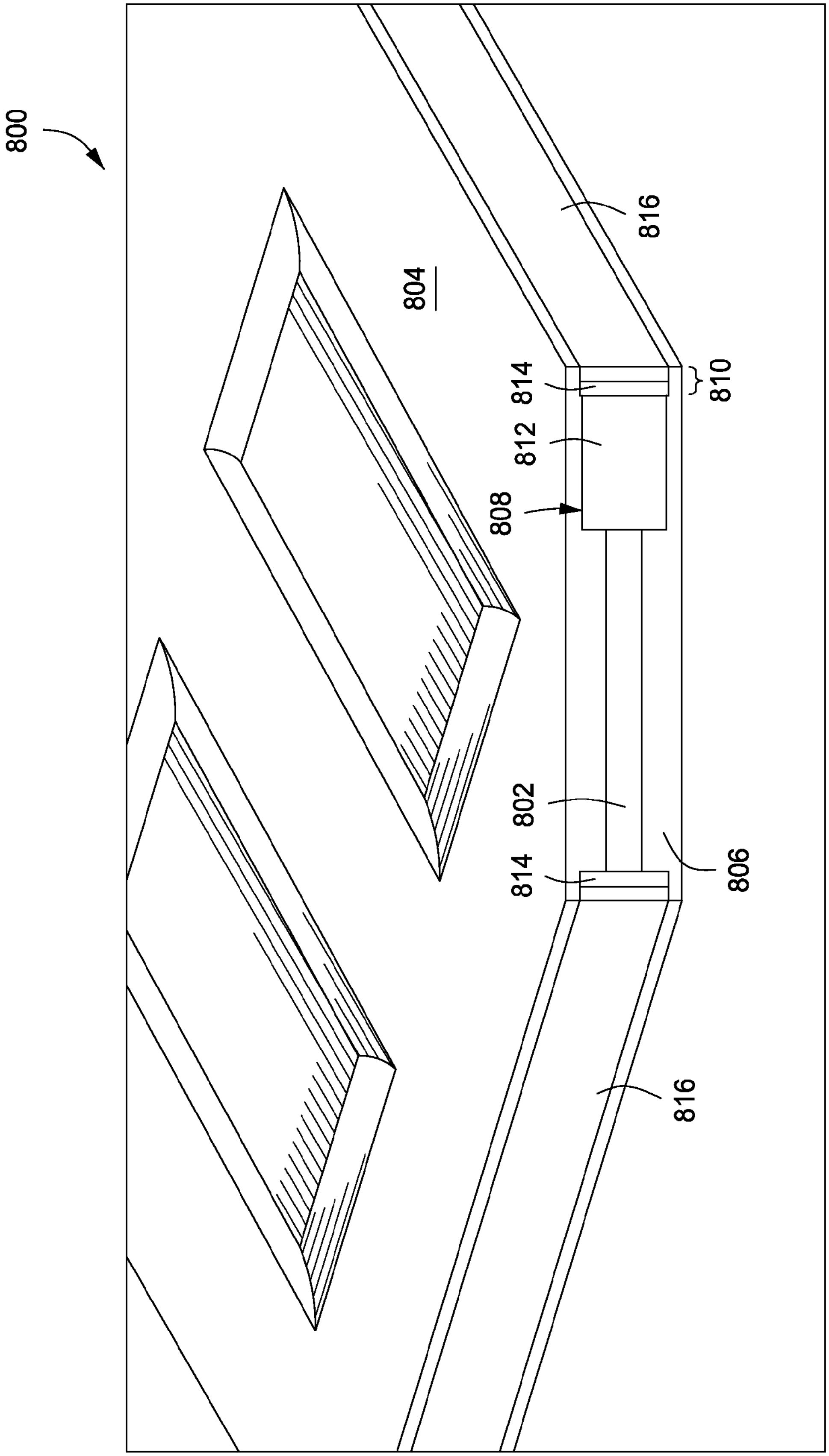
FIG. 8 is a partial perspective exploded view of a fire rated door in accordance with one embodiment of the present invention.

Referring now to FIG. 8, a partial perspective exploded view of a fire rated door 800 in accordance with one embodiment of the present invention is shown. The fire rated door 800 includes one or more protective layers 802 disposed between a first routable door panel 804 and a second routable door panel 806. The door panels 804 and 806 can be made of a lignocellulosic substrate, a wood, a wood composite, a medium density fiberboard or a combination thereof. The protective layers 802 can be a fire resistant material, a blast resistant material, a ballistic resistant material, a shielding material, a chemical resistant material, a biohazard resistant material, a radiation resistant material, a dampening material, a grounding material or a combination thereof. Each door panel 804 and 806 has two opposing longitudinal interior channels 808. The attached door panels 800 have a perimeter channel 810. Each interior channel 808 contains a spline, stick or rail 812. The spline 812 can be made of a hardwood or other hard composite material, and provides the benefits previously described. An intumescent banding material 814 and an exterior banding 816 to conceal the intumescent banding material 814 are disposed within the perimeter channel 810. As shown, the perimeter channel 810 extends to the spline 812. Alternatively, the perimeter channel 810 does not extend to the spline 812. A data device (not shown), such as a radio frequency identification device (RFID), containing production data is embedded within the door. The production data may include a date that the door was manufactured, a time that the door was manufactured, an order number, a purchase number, a product identifier, a purchaser identifier, a shift identifier, a personnel identifier, a machine line identifier, one or more specifications for the door, a list of hardware for the door, a size of the door, a style of the door, a routing design identifier, a parts list, an options identifier, a special features identifier, an assembly program (CNC) or a combination thereof. The protective layers 802, door panels 804 and 806 and splines 812 are attached together using an adhesive. Note also that an adhesive having fire retardant properties can be used. Likewise, the door panels can be coated with a fire resistant or retardant material.

Figure 9:
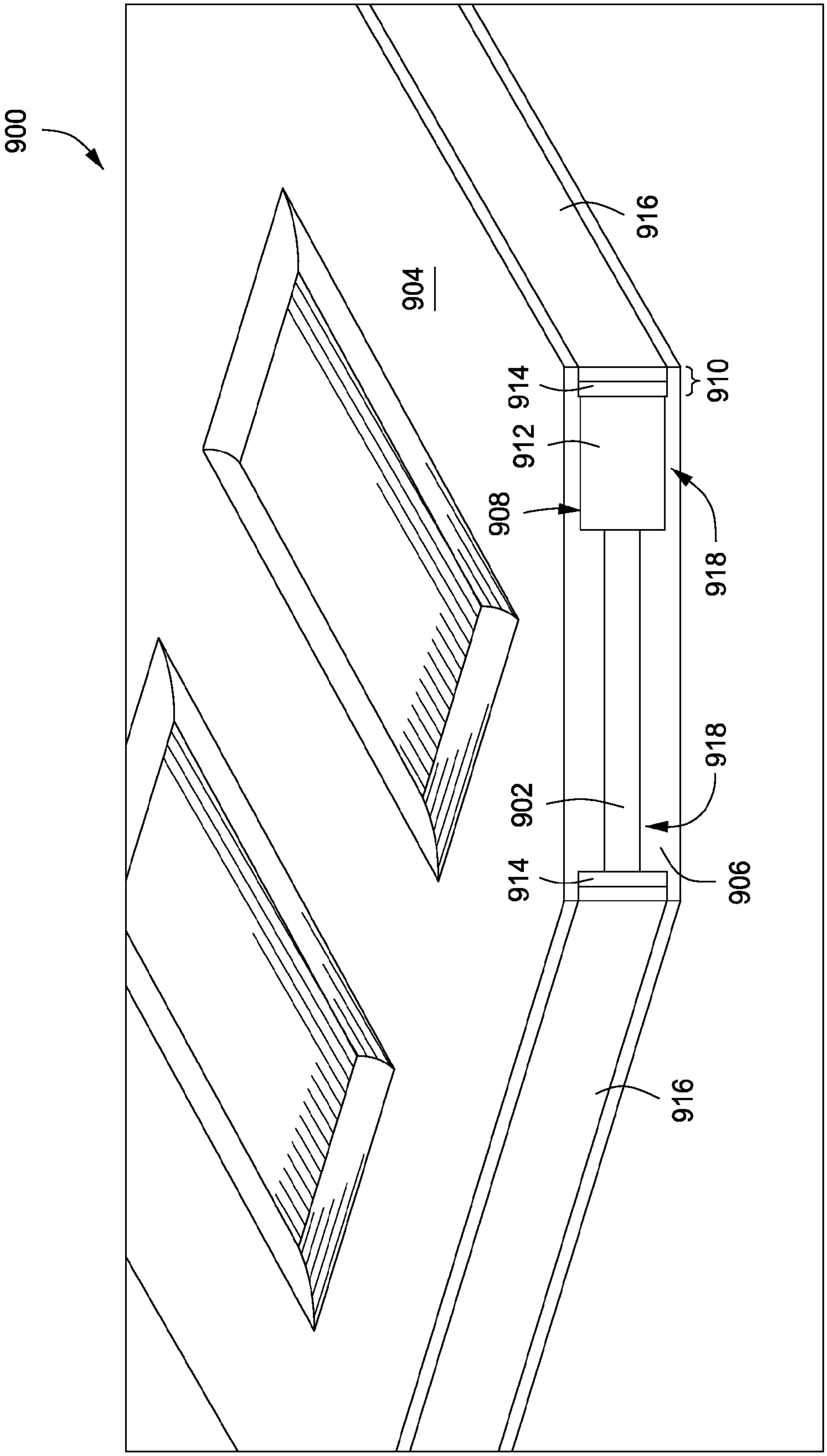
FIG. 9 is a partial perspective exploded view of a fire rated door in accordance with another embodiment of the present invention.

Now referring to FIG. 9, a partial perspective exploded view of a fire rated door in accordance with another embodiment of the present invention is shown. The fire rated door 900 includes one or more protective layers 902 disposed between a first routable door panel 904 and a second routable door panel 906. The door panels 904 and 906 can be made of a lignocellulosic substrate, a wood, a wood composite, a medium density fiberboard or a combination thereof. The protective layers 902 can be a fire resistant material, a blast resistant material, a ballistic resistant material, a shielding material, a chemical resistant material, a biohazard resistant material, a radiation resistant material, a dampening material, a grounding material or a combination thereof. Each door panel 904 and 906 has two opposing longitudinal interior channels 908. The attached door panels 900 have a perimeter channel 810. Each interior channel 908 contains a spline, stick or rail 912. The spline 912 can be made of a hardwood or other hard composite material, and provides the benefits previously described. An intumescent banding material 914 and an exterior banding 916 to conceal the intumescent banding material 914 are disposed within the perimeter channel 910. As shown, the perimeter channel 910 extends to the spline 912. Alternatively, the perimeter channel 910 does not extend to the spline 912. A data device (not shown), such as a radio frequency identification device (RFID), containing production data is embedded within the door. The production data may include a date that the door was manufactured, a time that the door was manufactured, an order number, a purchase number, a product identifier, a purchaser identifier, a shift identifier, a personnel identifier, a machine line identifier, one or more specifications for the door, a list of hardware for the door, a size of the door, a style of the door, a routing design identifier, a parts list, an options identifier, a special features identifier, an assembly program (CNC) or a combination thereof. The protective layers 902, door panels 904 and 906 and splines 912 are attached together using an adhesive. The one or more protective layers 902 and splines 912 are coated with an intumescent material 818. Note that the door panels 904 and 906 can also be coated with the intumescent material 818 or other fire retardant or resistant material. Note also that an adhesive having fire retardant properties can be used.

Figure 10:
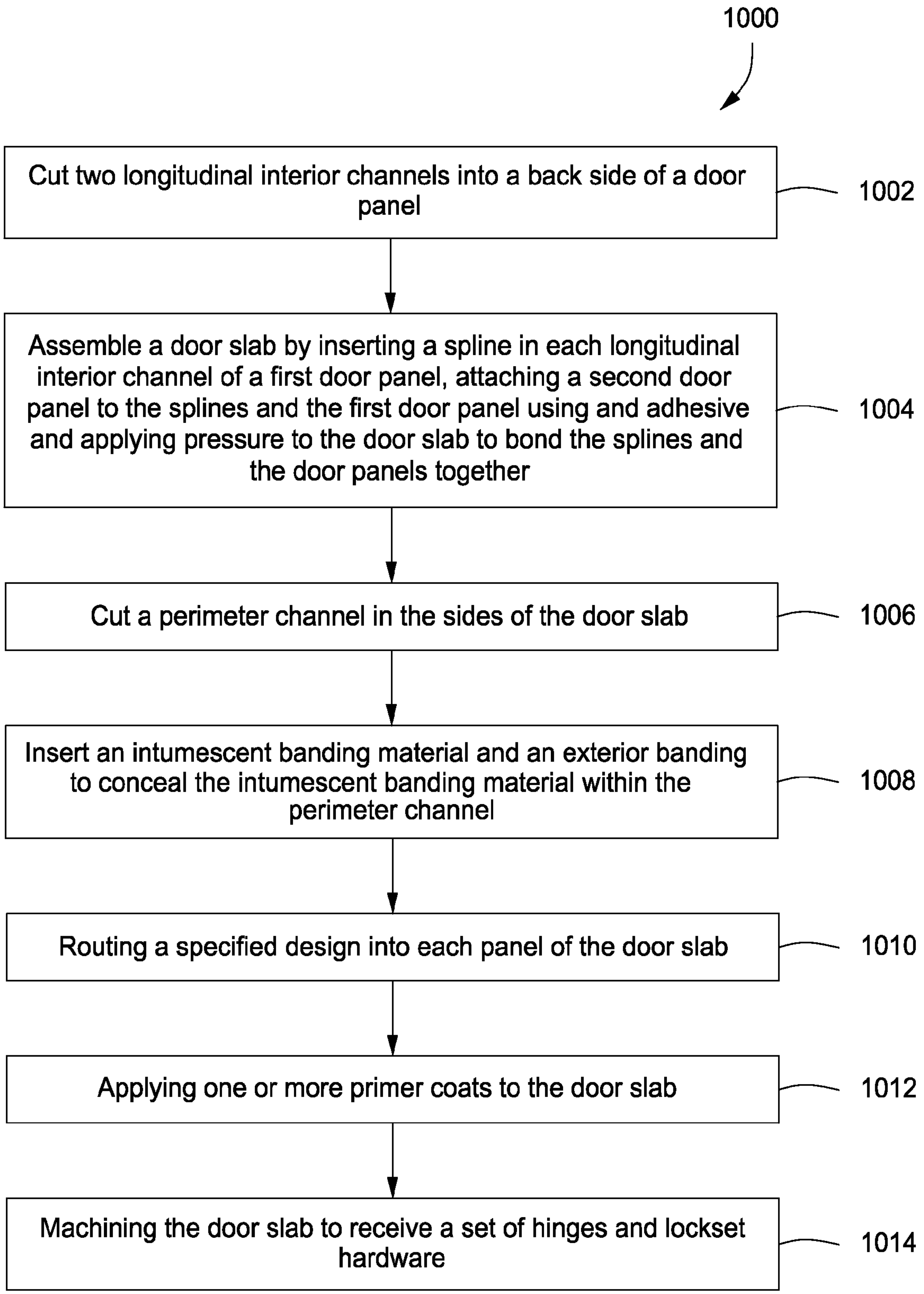
FIG. 10 is a flow chart illustrating a method to manufacture a fire rated door in accordance with one embodiment the present invention.

Referring now to FIG. 10, a flow chart illustrating a method 1000 to manufacture a fire rated door in accordance with one embodiment the present invention is shown. Two longitudinal interior channels are cut into a back side of a door panel in block 1002. Then in block 1004, the door is assembled by (a) inserting a spline in each longitudinal interior channel of a first door panel, (b) attaching a second door panel to the splines and the first door panel using an adhesive and (c) applying pressure to the door slab to bond the splines and the door panels together. A perimeter channel is cut in the sides of the door slab in block 1006. Note that the perimeter channel can extend to the spline. An intumescent banding material and an exterior banding to conceal the intumescent banding material are inserted into the perimeter channel in block 1008. Alternatively, the stiles and door panels can contain intumescent or fire resistant materials. A specified design is routed into each door panel of the door slab in block 1010. One or more primer coats are applied to the door slab in block 1012. The primer coats can be applied using an electrostatic powder coating process. Alternatively, the stiles, door panels and/or primer coats can contain intumescent or fire retardant/resistant materials. Note also that an adhesive having fire retardant properties can be used. The door slab is machined to receive a set of hinges and lockset hardware in block 1014. Note that this method can be implemented using a computer program embodied on a computer readable medium having one or more code segments to instruct a set of machines to perform the steps.

Figure 11:
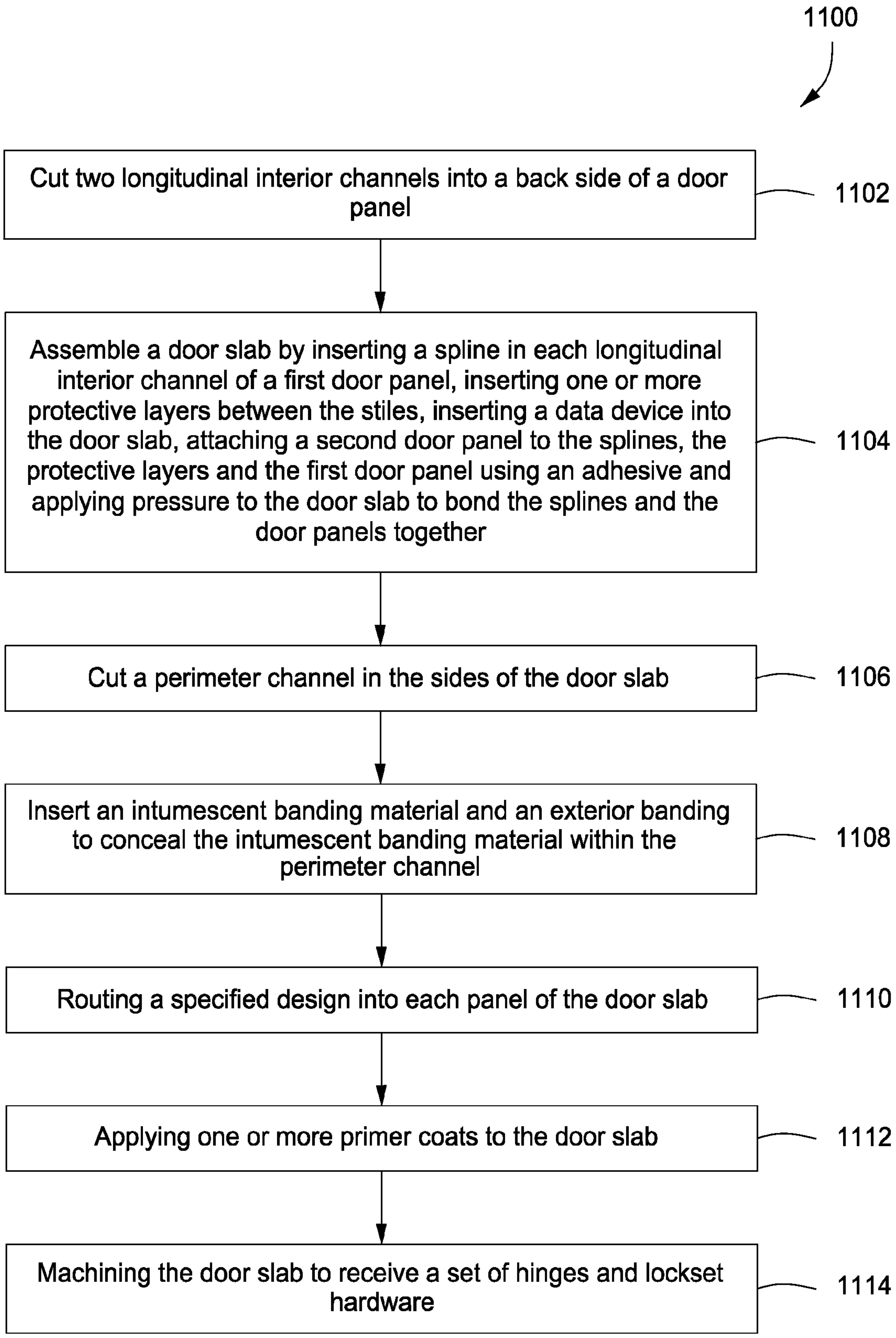
FIG. 11 is a flow chart illustrating a method to manufacture a fire rated door in accordance with another embodiment the present invention.

Now referring to FIG. 11, a flow chart illustrating a method 1100 to manufacture a fire rated door in accordance with another embodiment the present invention is shown. Two longitudinal interior channels are cut into a back side of a door panel in block 1102. Then in block 1104, the door is assembled by (a) inserting a spline in each longitudinal interior channel of a first door panel, (b) inserting one or more protective layers between the stiles, (c) inserting a data device into the door slab, (d) attaching a second door panel to the splines, the protective layers and the first door panel using an adhesive, and (e) applying pressure to the door slab to bond the splines and the door panels together. The protective layers can be a fire resistant material, a blast resistant material, a ballistic resistant material, a shielding material, a chemical resistant material, a biohazard resistant material, a radiation resistant material, a dampening material, a grounding material or a combination thereof. The data device contains production data, such as a date that the door was manufactured, a time that the door was manufactured, an order number, a purchase number, a product identifier, a purchaser identifier, a shift identifier, a personnel identifier, a machine line identifier, one or more specifications for the door, a list of hardware for the door, a size of the door, a style of the door, a routing design identifier, a parts list, an options identifier, a special features identifier, an assembly program (CNC) or a combination thereof. A perimeter channel is cut in the sides of the door slab in block 1106. Note that the perimeter channel can extend to the spline. An intumescent banding material and an exterior banding to conceal the intumescent banding material are inserted into the perimeter channel in block 1108. One or more primer coats are applied to the door slab in block 1112. The primer coats can be applied using an electrostatic powder coating process. Alternatively, the protective layers, stiles, door panels and/or primer coats can contain intumescent or fire retardant/resistant materials. Note also that an adhesive having fire retardant properties can be used. A specified design is routed into each door panel of the door slab in block 1110. The door slab is machined to receive a set of hinges and lockset hardware in block 1114. Note that this method can be implemented using a computer program embodied on a computer readable medium having one or more code segments to instruct a set of machines to perform the steps.

Figure 12:
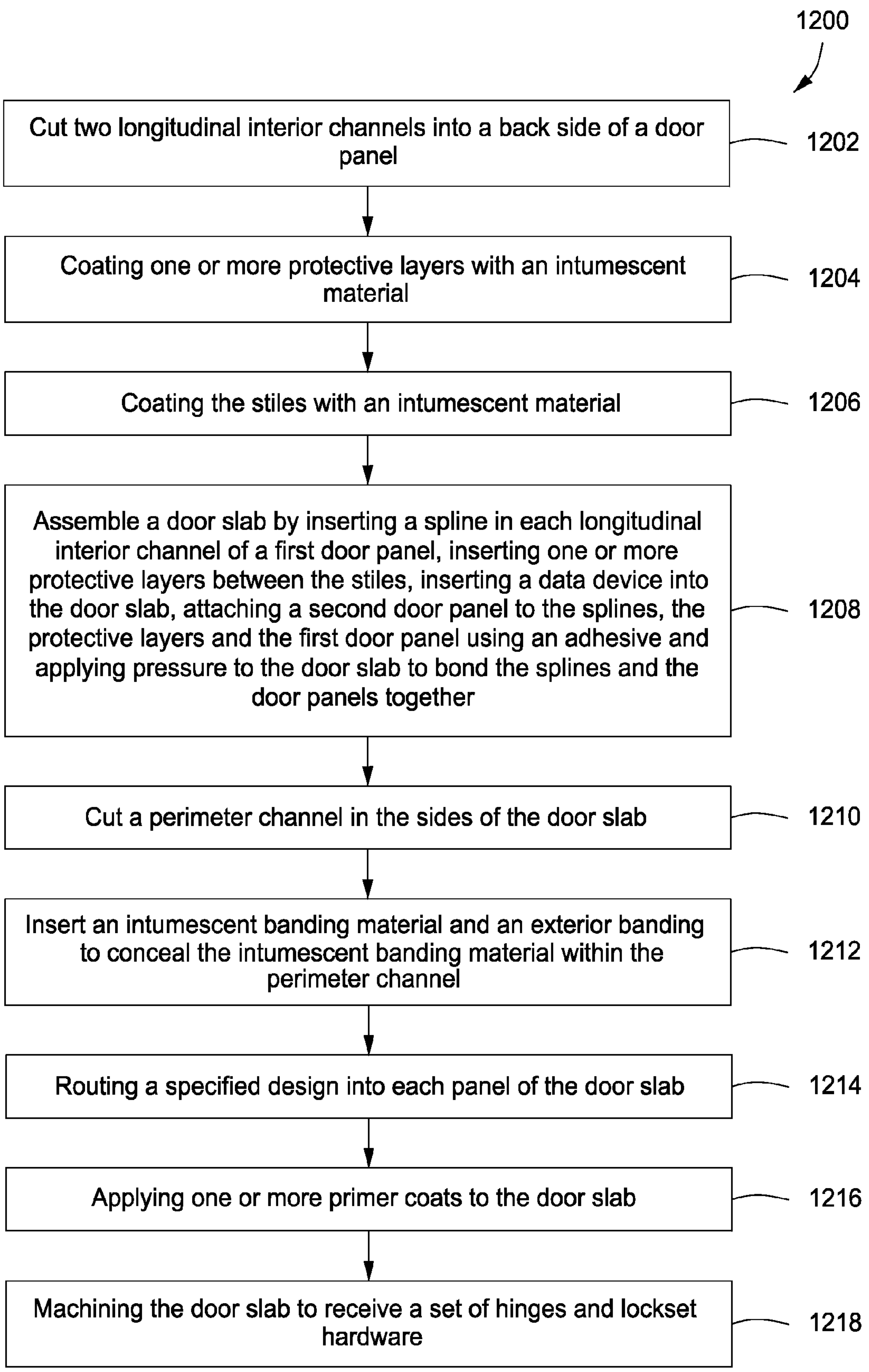
FIG. 12 is a flow chart illustrating a method to manufacture a fire rated door in accordance with yet another embodiment the present invention.

Referring now to FIG. 12, a flow chart illustrating a method 1200 to manufacture a fire rated door in accordance with yet another embodiment the present invention is shown. Two longitudinal interior channels are cut into a back side of a door panel in block 1202. One or more protective layers are coated with an intumescent material in block 1204 and the stiles are coated with the intumescent material in block 1206. The protective layers can be a fire resistant material, a blast resistant material, a ballistic resistant material, a shielding material, a chemical resistant material, a biohazard resistant material, a radiation resistant material, a dampening material, a grounding material or a combination thereof. Then in block 1208, the door is assembled by (a) inserting a spline in each longitudinal interior channel of a first door panel, (b) inserting one or more protective layers between the stiles, (c) inserting a data device into the door slab, (d) attaching a second door panel to the splines, the protective layers and the first door panel using an adhesive, and (e) applying pressure to the door slab to bond the splines and the door panels together. The data device contains production data, such as a date that the door was manufactured, a time that the door was manufactured, an order number, a purchase number, a product identifier, a purchaser identifier, a shift identifier, a personnel identifier, a machine line identifier, one or more specifications for the door, a list of hardware for the door, a size of the door, a style of the door, a routing design identifier, a parts list, an options identifier, a special features identifier, an assembly program (CNC) or a combination thereof. A perimeter channel is cut in the sides of the door slab in block 1210. Note that the perimeter channel can extend to the spline. An intumescent banding material and an exterior banding to conceal the intumescent banding material are inserted into the perimeter channel in block 1212. A specified design is routed into each door panel of the door slab in block 1214. One or more primer coats are applied to the door slab in block 1216. The primer coats can be applied using an electrostatic powder coating process. Alternatively, the protective layers, stiles, door panels and/or primer coats can contain intumescent or fire resistant/retardant materials. Note also that an adhesive having fire retardant properties can be used. The door slab is machined to receive a set of hinges and lockset hardware in block 1218. Note that this method can be implemented using a computer program embodied on a computer readable medium having one or more code segments to instruct a set of machines to perform the steps.

Figure 13:
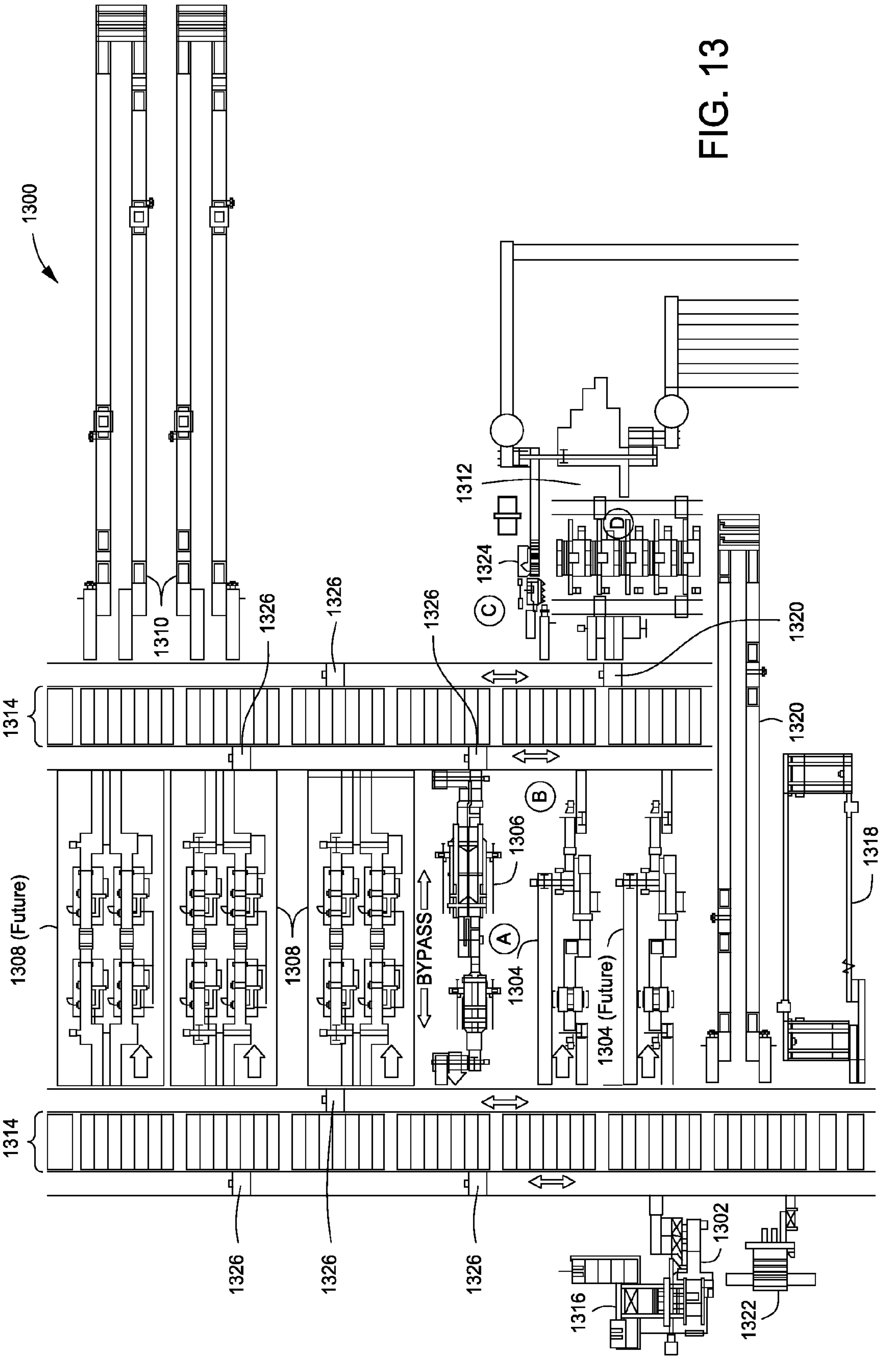
FIG. 13 is a block diagram of a manufacturing line in accordance with one embodiment of the present invention.

Now referring to FIG. 13, a block diagram of a manufacturing line 1300 in accordance with one embodiment of the present invention is shown. A first set of machines 1302 cuts two longitudinal interior channels into a back side of a door panel. A second set of machines 1304 assembles a door slab by inserting a spline in each longitudinal interior channel of a first door panel, attaching a second door panel to the splines and first door panel using an adhesive and applying pressure to door slab to bond the splines and door panels together. A third set of machines 1306 cut a perimeter channel in the sides of the door slab, and insert an intumescent banding material and an exterior banding to conceal the intumescent banding material within the perimeter channel. A fourth set of machines 1308 route a specified design into each panel of the door slab. A fifth set of machines 1310 apply one or more primer coats to the door slab. A sixth set of machines 1312 machine the door slab to receive a set of hinges and lockset hardware. One or more conveyors 1314 interconnect the machines to move the door slabs.

The manufacturing line may also include a seventh set of machines 1316 to cut large sheets of a lignocellulosic substrate, a wood, a wood composite, a medium density fiberboard or a combination thereof into a door panel. An eighth set of machines 1318 can be used to apply an intumescent coating to the splines and a ninth set of machines 1320 can be used to apply an intumescent coating to the one or more protective layers. The one or more protective layers are inserted between the first door panel and the second panel by the second set of machines 1304. A tenth set of machines 1322 cut the protective layers, such as gypsum board, to the proper size. An eleventh set of machines 1324 prehang and package the doors. The second set of machines 1304 can also a data device into the door slab. The data device provides one or more instructions to control one or more of the machines. As a result, the specified design for the router can be different for successive door slabs moving through the line. Moreover, the data device allows each door slab to be customized to satisfy a purchase order. All of the machines can be fully automated or semi-automated.

A more specific example of a production process in accordance with the present invention will not be described. The door panels are sawn to rough size from large sheets. The door panels are sized on long edges and grooved for splines or sticks, if necessary. The panels from the previous saw operation are automatically fed into a production line of several machines. The first operation in that line trims the long edges of the panels to a consistent and predetermined size for the product required. This same machine also machines two grooves to accept the aligning splines or sticks.

After the panels leave the machine in the step above, they are coated with a PUR hot melt adhesive, and then assembled into a door slab. This may consist of two door panels with encapsulated locating splines or sticks, an assembly without the splines, or a fire door or other type of assembly with or without splines. The third layer in a fire door assembly consists of a layer of ⅝" or ½" thick type C or type X gypsum board. This board may be coated with an intumescent or fire resistant paint or it may have the intumescent ingredients mixed within the gypsum. The splines, if present, may also be coated with the same intumescent or fire resistant paint. It is at this point that the RFID device is inserted internally. This RFID device will store information about the door, identifying it to all subsequent operations, so that the proper machine programs and parameters will be utilized during the processes of manufacturing. After the slab is assembled, it will run through pressure devices to assure a quality bond between the components, and will be automatically stacked down onto roller conveyor.

The next step in the process is to automatically feed the doors from stacks on the roller conveyor into an automated line that will first machine the short sides of the door so that they are parallel and to a specific dimension. The doors are then rotated 90 degrees and fed into a second machine that machines the long sides, giving them a 3 degree relief angle, makes those sides parallel and to proper dimension. These operations will also sand the machined edges to conceal the joint between the panels, and chamfer or radius the edges. When fire rated doors are being produced, the machines will also machine clearance for and install intumescent banding along all four edges, and will also have the ability to install another layer of paintable banding over the intumescent banding, to provide the required appearance of a solid substrate. After the machining, banding and sanding operations, the doors will again be automatically stacked on roller conveyor.

Doors are fed through automated router lines, where the first router machines one side of the door, a second station inverts the door, and another router machines the opposite side before they are automatically stacked.

After the doors have been sized and/or banded, they will be automatically fed from stacks into machine lines that will perform the routing per customer order to give them the desired final appearance of being of raised panel construction and/or carved. The first machine will work on one panel of the door, and when that operation is complete, the doors will be conveyed to a device that inverts it so that it can be introduced to a second machine which will work on the opposite panel. When this operation is complete, the doors will again be automatically stacked on roller conveyor.

The doors are fed through an automated prime coating line, where the top side is finished first, the doors are inverted, and the opposite side is finished. The doors then are fed into a second identical line which applies a second coat to all panels of the doors before they are automatically stacked. The doors are fed one at a time through a process that first sands the top panel to remove imperfections, denibs (remove whiskers) and cleans, preheats, sprays primer, cures the primer and denibs again. The doors are then inverted and the same steps are performed on the opposite panel, with one additional step: at the end of the process line, the long edges are denibbed. At this point, the doors are automatically sent into a second line which is identical to the first, applying a second coat to all panels. The doors are then automatically stacked on roller conveyor.

Alternatively, the doors are fed through an automated powder coat finish line. The doors are loaded either by hand or by a robot onto racks mounted to an overhead conveyor system. This conveyor system can be of a line conveyor type or a "power and free" type system. The doors are electrically charged either through contact through the racks/hooks and the conveyor system itself, or a conductive primer coating has been applied. After the doors are loaded onto the racks, they are sent through the preheat process. The preheat mechanism can be via one of three types; IR electric, IR gas catalytic or thermally via heated air circulation. Care needs to be taken in this process not to heat the doors too quickly, which can cause moisture to be driven to the panel resulting in cracks in the panel of the doors. Another issue could be scorching of the door panel. After preheating, the doors go to the powder application booth. The powder can be applied manually, semi-automatically (where an operator must be present to touch up areas to ensure complete coverage) or automatically. The powder itself can be of three types; thermo cure, low heat thermo cure or UV cure. After the powder is applied, the doors then proceed to the curing process. The curing process is accomplished through the application of heat via IR devices. These IR devices can be of different wavelength for different applications, or they can be of a combination of short, medium and long wavelength to improve the curing properties. At the end of the curing cycle, a UV light source can be utilized for the UV cured powder type. Next in the process is the cool down tunnel where cool air is circulated to bring the doors down to a temperature where they can be handled. They are then removed from the conveyor system and stacked, either manually or with a robot. The panels that can be obtained with the above process can range in texture from smooth to rough, and the gloss level can range from low to high gloss.

The doors are fed through an automated machine line where they are prepared for hinges and lock sets as required. After this operation, the doors pass through an automatic inspection station, where they are checked via machine vision and laser inspection/measuring equipment for conformation to standards, and to verify that the doors match the intended specifications recorded on the enclosed RFID chip. They are then automatically stacked and packaged for shipment.

This machine line will machine the edges of the doors for the proper hinges and lockset hardware. The doors are automatically fed into and stacked from this process as well. It is after this operation where we may inject the pilot holes for the hinge screws with the chemical to improve the screw holding properties.

Each of these machine lines will receive the instructions for what work is to be performed on each door via the encoded information stored on the embedded RFID device.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A manufacturing line to produce fire rated doors comprising:

a first set of machines to cut two longitudinal interior channels into a back side of a door panel and two longitudinal interior channels into a back side of a second door-sized panel;

a second set of machines to assemble a door slab by (a) inserting a spline in each longitudinal interior channel of the first door-sized panel, (b) attaching the back side of the second door-sized panel directly to (i) the splines inserted in the first door-sized panel such that the splines are also inserted into the longitudinal interior channels of the second door-sized panel and (ii) the back of the first door-sized panel using an adhesive, and (c) applying pressure to the door slab to bond the splines and the door-sized panels together;

a third set of machines to cut a perimeter channel in each side of the door slab, and insert (a) an intumescent banding material in each perimeter channel, and (b) an exterior banding in each perimeter channel to conceal the intumescent banding material within the perimeter channel;

one or more conveyors interconnecting the machines to move the door slabs; and wherein the fire rating for the door is achieved without a mineral core disposed between the first door-sized panel and the second door sized panel by (a) the intumescent banding material and (b) one or more of the following: (i) the adhesive is fire resistant, (ii) the first door-sized panel and the second door-sized panel contain an intumescent or fire resistant material, or (iii) the first door-sized panel and the second door-sized panel are coated with the intumescent or fire resistant material.

2. The manufacturing line as recited in claim 1, wherein the first door-sized panel and the second door-sized panel comprise a lignocellulosic substrate, a wood, a wood composite, a medium density fiberboard or a combination thereof.

3. The manufacturing line as recited in claim 1, further comprising a fourth set of machines to route a specified design into a front side of the first door-sized panel and/or a front side of the second door-sized panel.

4. The manufacturing line as recited in claim 3, wherein the specified design is different for successive door slabs moving through the line.

5. The manufacturing line as recited in claim 1, further comprising a fifth set of machines to apply one or more primer coats to the door slab.

6. The manufacturing line as recited in claim 5, wherein the one or more primer coats include an intumescent material.

7. The manufacturing line as recited in claim 5, wherein the one or more primer coats are applied with an electrostatic powder coating process.

8. The manufacturing line as recited in claim 1, further comprising a sixth set of machines to machine the door slab to receive a set of hinges and lockset hardware.

9. The manufacturing line as recited in claim 8, wherein the sixth set of machines further injects a chemical into one or more screw pilot holes to increase screw holding capacity or pull strength.

10. The manufacturing line as recited in claim 1, further comprising a seventh set of machines to cut large sheets of a lignocellulosic substrate, a wood, a wood composite, a medium density fiberboard or a combination thereof into the door-sized panels.

11. The manufacturing line as recited in claim 1, wherein the first set of machines further trims the long edges of the door panels.

12. The manufacturing line as recited in claim 1, wherein:

the first set of machines further cuts a large interior channel into the back of the first door-sized panel and/or the back of the second door-sized panel between the two longitudinal interior channels; and the second set of machines further inserts one or more protective layers into the large interior channel.

13. The manufacturing line as recited in claim 12, wherein the one or more protective layers comprise an additional fire resistant material, a blast resistant material, a ballistic resistant material, a shielding material, a chemical resistant material, a biohazard resistant material, a radiation resistant material, a dampening material, a grounding material or a combination thereof.

14. The manufacturing line as recited in claim 12, wherein the one or more protective layers comprise one or more gypsum boards, one or more metallic sheets, one or more lead sheets, one or more Kevlar sheets, one or more ceramic sheets, a layer of urethane foam, a layer of graphite, a wire mesh or a combination thereof.

15. The manufacturing line as recited in claim 12, wherein the one or more protective layers contain an intumescent or fire resistant material, or are coated with the intumescent or fire resistant material.

16. The manufacturing line as recited in claim 1, wherein the perimeter channel along the longitudinal sides of the first door panel and the second door panel extend to the spline.

17. The manufacturing line as recited in claim 1, wherein each door slab is customized to satisfy a purchase order.

18. The manufacturing line as recited in claim 1, further comprising an eighth set of machines to apply an intumescent coating to the splines.

19. The manufacturing line as recited in claim 1, wherein the second set of machines further embeds a data device into the door slab.

20. The manufacturing line as recited in claim 19, wherein the data device provides one or more instructions to control one or more of the machines.

21. The manufacturing line as recited in claim 19, wherein the production data comprises a date that the door was manufactured, a time that the door was manufactured, an order number, a purchase number, a product identifier, a purchaser identifier, a shift identifier, a personnel identifier, a machine line identifier, one or more specifications for the door, a list of hardware for the door, a size of the door, a style of the door, a routing design identifier, a parts list, an options identifier, a special features identifier, an assembly program or a combination thereof.

22. The manufacturing line as recited in claim 1, wherein the second set of machines further inserts one or more protective layers between the first door panel and the second panel.

23. The manufacturing line as recited in claim 22, further comprising a ninth set of machines to apply an intumescent coating to the one or more protective layers.

24. The manufacturing line as recited in claim 1, wherein all of the machines are automated or semi-automated.

25. A manufacturing line to produce fire rated doors comprising:

a first set of machines to cut two longitudinal interior channels into a back side of a door panel, two longitudinal interior channels into a back side of a second door-sized panel, and a large interior channel into the back of the first door-sized panel and/or the back of the second door-sized panel between the two longitudinal interior channels;

a second set of machines to assemble a door slab by (a) inserting a spline in each longitudinal interior channel of the first door-sized panel, (b) inserting one or more protective layers into the large interior channel, (c) attaching the back side of the second door-sized panel directly to (i) the splines inserted in the first door-sized panel such that the splines are also inserted into the longitudinal interior channels of the second door-sized panel and (ii) the back of the first door-sized panel using an adhesive, and (d) applying pressure to the door slab to bond the splines and the door-sized panels together;

a third set of machines to cut a perimeter channel in each side of the door slab, and insert (a) an intumescent banding material in each perimeter channel, and (b) an exterior banding in each perimeter channel to conceal the intumescent banding material within the perimeter channel;

a fourth set of machines to route a specified design into a front side of the first door-sized panel and/or a front side of the second door-sized panel;

a fifth set of machines to apply one or more primer coats to the door slab;

a sixth set of machines to machine the door slab to receive a set of hinges and lockset hardware;

one or more conveyors interconnecting the machines to move the door slabs; and wherein the fire rating for the door is achieved without a mineral core disposed between the first door-sized panel and the second door sized panel by (a) the intumescent banding material and (b) one or more of the following: (i) the adhesive is fire resistant, (ii) the first door-sized panel and the second door-sized panel contain an intumescent or fire resistant material, or (iii) the first door-sized panel and the second door-sized panel are coated with the intumescent or fire resistant material.

26. The manufacturing line as recited in claim 25, wherein the first door-sized panel and the second door-sized panel comprise a lignocellulosic substrate, a wood, a wood composite, a medium density fiberboard or a combination thereof.

27. The manufacturing line as recited in claim 25, wherein the specified design is different for successive door slabs moving through the line.

28. The manufacturing line as recited in claim 25, wherein the one or more primer coats include an intumescent material.

29. The manufacturing line as recited in claim 25, wherein the one or more primer coats are applied with an electrostatic powder coating process.

30. The manufacturing line as recited in claim 25, wherein the sixth set of machines further injects a chemical into one or more screw pilot holes to increase screw holding capacity or pull strength.

31. The manufacturing line as recited in claim 25, further comprising a seventh set of machines to cut large sheets of a lignocellulosic substrate, a wood, a wood composite, a medium density fiberboard or a combination thereof into the door-sized panels.

32. The manufacturing line as recited in claim 25, wherein the first set of machines further trims the long edges of the door panels.

33. The manufacturing line as recited in claim 25, wherein the one or more protective layers comprise an additional fire resistant material, a blast resistant material, a ballistic resistant material, a shielding material, a chemical resistant material, a biohazard resistant material, a radiation resistant material, a dampening material, a grounding material or a combination thereof.

34. The manufacturing line as recited in claim 25, wherein the one or more protective layers comprise one or more gypsum boards, one or more metallic sheets, one or more lead sheets, one or more Kevlar sheets, one or more ceramic sheets, a layer of urethane foam, a layer of graphite, a wire mesh or a combination thereof.

35. The manufacturing line as recited in claim 25, wherein the one or more protective layers contain an intumescent or fire resistant material, or are coated with the intumescent or fire resistant material.

36. The manufacturing line as recited in claim 25, wherein the perimeter channel along the longitudinal sides of the first door panel and the second door panel extend to the spline.

37. The manufacturing line as recited in claim 25, wherein each door slab is customized to satisfy a purchase order.

38. The manufacturing line as recited in claim 25, further comprising an eighth set of machines to apply an intumescent coating to the splines.

39. The manufacturing line as recited in claim 25, wherein the second set of machines further embeds a data device into the door slab.

40. The manufacturing line as recited in claim 39, wherein the data device provides one or more instructions to control one or more of the machines.

41. The manufacturing line as recited in claim 39, wherein the production data comprises a date that the door was manufactured, a time that the door was manufactured, an order number, a purchase number, a product identifier, a purchaser identifier, a shift identifier, a personnel identifier, a machine line identifier, one or more specifications for the door, a list of hardware for the door, a size of the door, a style of the door, a routing design identifier, a parts list, an options identifier, a special features identifier, an assembly program or a combination thereof.

42. The manufacturing line as recited in claim 25, further comprising a ninth set of machines to apply an intumescent coating to the one or more protective layers.

43. The manufacturing line as recited in claim 25, wherein all of the machines are automated or semi-automated.

44. A computer program embodied on a computer readable medium that is executed by a computer to control a set of machines to manufacture a fire rated door comprising:

a code segment for cutting two longitudinal interior channels into a back side of a first door-sized panel and two longitudinal interior channels into a back side of a second door-sized panel;

a code segment for assembling a door slab by (a) inserting a spline in each longitudinal interior channel of the first door-sized panel, (b) attaching the back side of the second door-sized panel directly to (i) the splines inserted in the first door-sized panel such that the splines are also inserted into the longitudinal interior channels of the second door-sized panel and (ii) the back of the first door-sized panel using an adhesive, and (c) applying pressure to the door slab to bond the splines and the door-sized panels together;

a code segment for cutting a perimeter channel in each side of the door slab;

a code segment for inserting (a) an intumescent banding material in each perimeter channel, and (b) an exterior banding in each perimeter channel to conceal the intumescent banding material within the perimeter channel; and wherein the fire rating for the door is achieved without a mineral core disposed between the first door-sized panel and the second door sized panel by (a) the intumescent banding material and (b) one or more of the following: (i) the adhesive is fire resistant, (ii) the first door-sized panel and the second door-sized panel contain an intumescent or fire resistant material, or (iii) the first door-sized panel and the second door-sized panel are coated with the intumescent or fire resistant material.

45. The computer program as recited in claim 44, further comprising:

a code segment for cutting a large interior channel into the back of the first door-sized panel and/or the back of the second door-sized panel between the two longitudinal interior channels; and a code segment for inserting one or more protective layers into the large interior channel.

46. The computer program as recited in claim 44, further comprising a code segment for routing a specified design into a front side of the first door-sized panel and/or a front side of the second door-sized panel.

47. The computer program as recited in claim 44, further comprising a code segment for machining the door slab to receive a set of hinges and lockset hardware.

* * * * *